(12) United States Patent
Aragon y Willems

(10) Patent No.: US 10,540,443 B2
(45) Date of Patent: Jan. 21, 2020

(54) SYSTEMS AND METHODS FOR DETERMINING REFERENCES IN PATENT CLAIMS

(71) Applicant: LexisNexis, a division of Reed Elsevier Inc., Miamisburg, OH (US)

(72) Inventor: Peter Francisco Aragon y Willems, Voorhout (NL)

(73) Assignee: RELX INC., New York, NY (US)

( * ) Notice: Subject to any disclaimer, the term of this patent is extended or adjusted under 35 U.S.C. 154(b) by 290 days.

(21) Appl. No.: 15/384,870

(22) Filed: Dec. 20, 2016

(65) Prior Publication Data

US 2018/0173811 A1    Jun. 21, 2018

(51) Int. Cl.
    *G06F 17/30*    (2006.01)
    *G06F 17/27*    (2006.01)

(52) U.S. Cl.
    CPC .................. *G06F 17/277* (2013.01)

(58) Field of Classification Search
    CPC ...................................... G06F 17/30
    USPC ............................................ 707/736
    See application file for complete search history.

(56) References Cited

U.S. PATENT DOCUMENTS

| | | |
|---|---|---|
| 6,038,561 A | 3/2000 | Snyder et al. |
| 2001/0049707 A1 | 12/2001 | Tran |
| 2006/0036632 A1 | 2/2006 | Williams |
| 2007/0078886 A1 | 4/2007 | Rivette et al. |
| 2008/0281860 A1 | 11/2008 | Elias et al. |
| 2013/0198092 A1 | 8/2013 | Dugan et al. |
| 2013/0262968 A1 | 10/2013 | Gartman et al. |
| 2015/0143329 A1 | 5/2015 | Barinaga |
| 2015/0187033 A1 | 7/2015 | Sukman et al. |
| 2016/0154786 A1 | 6/2016 | Neustel |

OTHER PUBLICATIONS

International Search Report and Written Opinion issued in corresponding PCT application No. PCT/US17/67551, dated Mar. 9, 2018.

*Primary Examiner* — Kim T Nguyen
(74) *Attorney, Agent, or Firm* — Dinsmore & Shohl LLP

(57) ABSTRACT

Systems and methods of determining relationships between patent claims and generating a streamlined claim tree indicating the relationships are disclosed. A method of relationships includes determining claims in a claim list, searching for a reference in each claim, the reference referring to another one of the claims, and for each claim containing unique references, determining that an associated number for each unique reference is less than a number of a claim containing the unique reference, appending a data file corresponding to the claim list with ancestral data that indicates all ancestors of the claim based on the associated number and with self-referential data corresponding to the claim, determining that the claim includes parent claims and ancestor claims, and appending the data file with respect to the parent claims and the ancestor claims to indicate a relationship between the claim and the parent claims and the claim and the ancestor claims.

20 Claims, 11 Drawing Sheets

SYSTEMS AND METHODS FOR DETERMINING REFERENCES IN PATENT CLAIMS

BACKGROUND

Field

The present specification generally relates to determining claim references in patent documents and, more particularly, to systems and methods that determine claim dependencies in a patent document and create a streamlined claim tree therefrom.

Technical Background

Currently, imaged and/or digitally rendered patent documents such as published patents and published patent applications require optical character recognition (OCR) software to translate the images and/or digital renderings into computer readable text. Current OCR software, which may be used to translate the images and/or digital renderings of the claims portion of the patent documents into computer readable text, is insufficient in that it does not accurately provide information in a data file such as an XML file regarding claim dependencies, regardless of the language and the syntax in which the claim is written. In addition, the OCR translation may contain errors that are not easily detectable by electronic means. Moreover, the OCR software generates data that cannot be used to quickly create a claim tree that can be used to verify the accuracy of a determined claim dependency.

Accordingly, a need exists for systems and methods that can obtain imaged and/or digitally rendered patent claims, quickly and accurately determine claim dependencies, regardless of language or syntax used to draft the claim, detect and correct errors and provide confidence levels, and provide a claim tree based on the determined claim dependencies.

SUMMARY

In one embodiment, a method of determining one or more relationships between patent claims includes determining, by a processing device, one or more claims in a claim list, searching, by the processing device, for at least one reference in each one of the one or more claims, wherein the at least one reference refers to another one of the one or more claims in the claim list, and for each one of the one or more claims containing one or more unique references, determining, by the processing device, that an associated number for each of the one or more unique references is less than a number of a claim containing the one or more unique references, appending, by the processing device, a data file corresponding to the claim list with ancestral data that indicates all ancestors of the claim based on the associated number, appending, by the processing device, the data file with self-referential data corresponding to the claim, determining, by the processing device, that the claim includes one or more parent claims, appending, by the processing device, the data file to indicate, with respect to information relating to the one or more parent claims, a relationship between the claim and the one or more parent claims, determining, by the processing device, that the claim includes one or more ancestor claims, and appending, by the processing device, the data file to indicate, with respect to information relating to the one or more ancestor claims, a relationship between the claim and the one or more ancestor claims.

In another embodiment, a system for determining one or more relationships between patent claims includes a processing device and a non-transitory, processor-readable storage medium in communication with the processing device. The non-transitory, processor-readable storage medium includes one or more programming instructions that, when executed, cause the processing device to determine one or more claims in a claim list, search for at least one reference in each one of the one or more claims, where the at least one reference refers to another one of the one or more claims in the claim list, and for each one of the one or more claims containing one or more unique references, determine that an associated number for each of the one or more unique references is less than a number of a claim containing the one or more unique references, append a data file corresponding to the claim list with ancestral data that indicates all ancestors of the claim based on the associated number, append the data file with self-referential data corresponding to the claim, determine that the claim includes one or more parent claims, append the data file to indicate, with respect to information relating to the one or more parent claims, a relationship between the claim and the one or more parent claims, determine that the claim includes one or more ancestor claims, and append the data file to indicate, with respect to information relating to the one or more ancestor claims, a relationship between the claim and the one or more ancestor claims.

In yet another embodiment, a method of electronically generating a streamlined claim tree indicating one or more relationships between patent claims includes, for each claim of the patent claims, determining, by a processing device, a vertical order of a claim, appending, by the processing device, a data file corresponding to a claim list of the patent claims with vertical order data corresponding to the vertical order, determining, by a processing device, a horizontal order of the claim, appending, by the processing device, the data file with horizontal order data corresponding to the horizontal order, determining, by the processing device, a horizontal position of the claim, appending, by the processing device, the data file with horizontal position data corresponding to the horizontal position, determining, by the processing device, one or more ordered parents of the claim, appending, by the processing device, the data file with ordered parents data corresponding to the one or more ordered parents, determining, by the processing device, a right most parent of the claim, appending, by the processing device, the data file with right most parent data corresponding to the right most parent, determining, by the processing device, one or more ordered children of the claim, and appending, by the processing device, the data file with ordered children data corresponding to the one or more ordered children. The vertical order, the horizontal order, the horizontal position, the one or more ordered parents, the right most parent, and the one or more ordered parents are determined from generated relationship data. The data file provides information for generating the streamlined claim tree.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1:
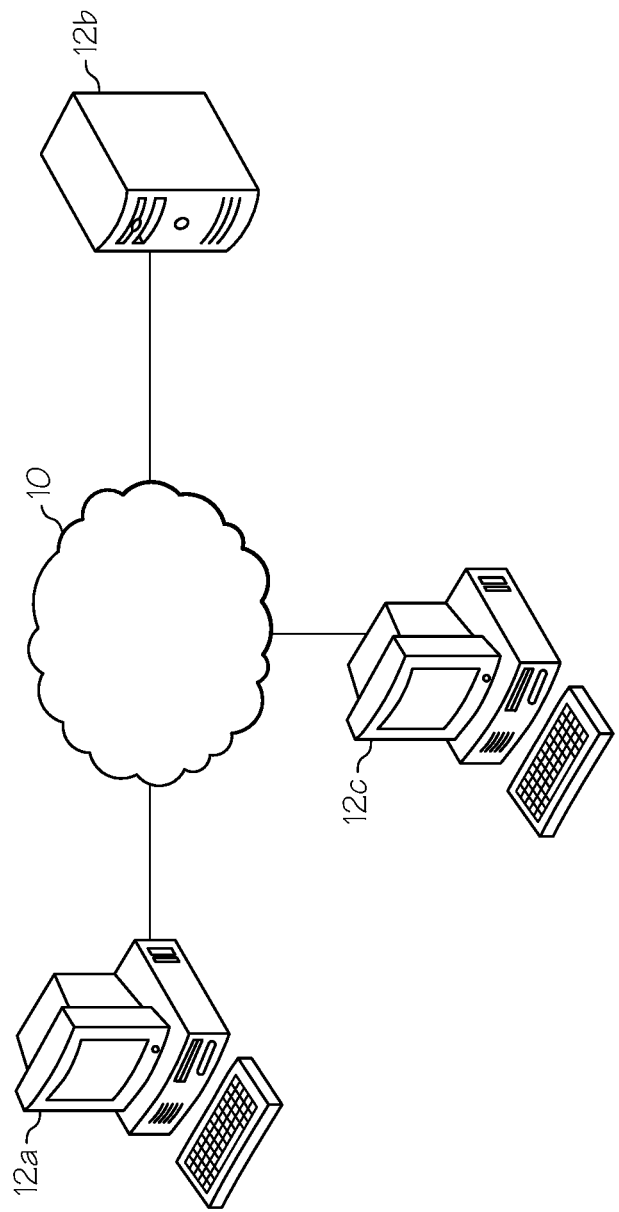
FIG. 1 is a schematic depiction of an illustrative computing network for a system for determining references in patent claims according to one or more embodiments shown and described herein.

Referring generally to the figures, embodiments described herein are directed to systems and methods for obtaining computer readable text that includes claims in a patent document (which may include obtaining an image of a patent document and conducting an OCR process to translate the claims into computer-readable and/or human readable text), determining and verifying claim references from the computer readable text, and creating a claim tree based on the determined claim references. The systems and methods described herein are particularly configured to quickly determine claim references regardless of the language and the syntax in which the claims are written. The systems and methods described herein can also be used to detect OCR translation errors and/or typographical errors by analyzing each of the claims from a plurality of different perspectives such that dependencies are verified or corrected. In addition, the claim tree created by the systems and methods described herein may allow users to more quickly and easily visualize relationships between patent claims, particularly in instances where a patent document contains a large number of claims, multiple dependent claims, claims that depend from one or more dependent claims, and/or the like.

As will be described in greater detail herein, the systems and methods improve the functioning of the computing devices incorporated therein relative to other computing devices because the systems and methods described herein allow a computing device to analyze any patent claims, regardless of language, syntax, or origin. That is, the same programming (e.g., the same base engine) may be used to determine claim references that are in English, Spanish, German, Mandarin Chinese, Korean, Japanese, or any other language without the need for base programming that is specific to each language. Rather, language-specific detection rules can be stored in smaller and more easily accessible external configuration files. Moreover, the systems and methods described herein improve the functioning of the computer by training the computer for each language in a significantly less amount of time than what would be required using existing systems and methods (e.g., training may take up to two or three days using the systems and methods described herein, rather than greater than two months using existing systems and methods).

Similarly, the same programming may be used to determine claim references that are in different syntactical formats. For example, if method claim 5 is a multiple dependent claim that depends from each of claims 1-4, it may be written in any one of the following syntactical formats, all of which may have the same meaning: "the method of any one of claims 1-4, wherein," "the method of claim 1, 2, 3, or 4, wherein," "the method of any of the preceding claims, wherein," "the method according to any one of claims 1-4, wherein," "a method according to any one of claims 1-4, wherein," and "the method of any one of claims 1-4." Other systems and methods would require additional processing steps and/or potentially more processing power to determine the meaning of each of these syntactical formats before a determination of the references can be made. Moreover, if the claim contains a typographical error or is arranged in a particular format that is not recognized according to the programming, other processes may fail and/or incorrectly identify the appropriate claim references. In contrast, the systems and methods described herein are able to accurately determine the appropriate claim references regardless of syntax (including whether the syntax is a recognized format) and/or regardless of typographical errors because the programming is designed to analyze and verify claim references based on each claim individually, as well as the claims as a whole.

It should be understood that while the systems and methods described herein may be particularly useful for claim sets including a plurality of claim (including at least one independent claim and at least one dependent claim), the systems and methods described herein are not limited to such. For example, the systems and methods described herein may also be used for patent documents containing a single claim and patent documents that only contain independent claims (e.g., no dependent or multiple dependent claims).

As used herein, the term "patent document" generally refers to any document that contains patent claims therein. That is, a patent document may be a patent or patent-related document (or portion thereof) that has been published. However, it should be understood that in some embodiments, a patent document may also be an unpublished document, such as a draft or the like. An illustrative patent document may generally be an issued patent; a patent application that has been published by a national patent body such as, but not limited to, the United States Patent and Trademark Office (USPTO), the State Intellectual Property Office (SIPO) of China, the Japan Patent Office (JPO), the Korean Intellectual Property Office (KIPO), IP Australia, and the like; a patent application that has been published by an international or a regional body, such as, but not limited to, the World Intellectual Property Office (WIPO), the European Patent Office (EPO), the African Regional Intellectual Property Organization (ARIPO), and the like; a reissue patent; a design patent or application; a plant patent or application; a provisional patent application; a corrected patent; a certificate of addition; a utility model; an industrial design; a laid open document; a petty patent; an economic patent; an inventor's certificate; a translation of any of the foregoing; and/or the like.

As used herein, a "claim" refers to a particularly worded and constructed sentence that defines the limits of a patent document. As such, a claim defines what a patent document does or does not cover. The patent right to exclude others from making, using, or selling something may be based on what is defined in a claim. At least one claim always appears in a patent document, but the exact location may vary depending on the patent document (e.g., at the beginning of a patent document, at the end of a patent document, or the like). In some embodiments, the claims may be an ordered list. In some embodiments, the claims may be preceded by a header or phrase indicating the beginning of the claims, such as the phrases "What is claimed is . . . ", "I claim . . . " or "Claims".

Claims can be classified based on whether they reference other claims, and if they reference other claims, how they reference those other claims. A claim that does not reference another claim is an independent claim and a claim that references at least one earlier appearing claim in the ordered list of claims is a dependent claim. Illustrative examples of language that indicates a particular claim classification (e.g., claim type) based on how it references another claim may include, but are not limited to the examples provided in Table 1 below:

TABLE 1

| Claim Type | Illustrative Language |
| --- | --- |
| Single | "according to claim 1" |
| Range | "according to claims 1 to 5" |
| Collection | "according to claims 1, 2, and 5" |
| Collection of Ranges ("RangeCollection") | "according to claims 1, 5 to 10, 13, and 17 to 20" |
| Plural Preceding ("Preceding") | "according to the previous claims" |
| Single Preceding ("PrecedingSingle") | "according to the previous claim" |
| Plural Preceding of a particular number ("PrecedingN") | "according to the previous 3 claims" |
| First particular number ("FirstN") | "according to the first four claims" |

It should be understood that the examples provided in the above references are merely illustrative, and that other claim types and sample language thereof are included without departing from the scope of the present disclosure. In addition, use of a language other than English is also contemplated. Illustrative examples of other languages that may be used for the purposes of classifying include, but are not limited to, Bulgarian, Simplified Chinese, Traditional Chinese, Czech, Dutch, Finnish, French, German, Greek, Italian, Japanese, Korean, Polish, standard Portuguese, Russian, Slovak, Spanish, and Swedish. It should further be understood that certain claims may contain a classification overlap (i.e., the claim may be worded such that it can be classified as more than one claim type). For example, the phrase "claim 1 to 5" may be classified as single ("claim 1") and range ("claim[s] 1 to 5") to ensure greater accuracy in appropriately classifying the claims and identifying OCR translation errors and/or to keep the base engine simple and maintainable such that it does not need to rely on complex decision trees that can be used in existing systems, as will be described in greater detail herein.

In general, OCR is not perfect and may result in electronically recognized text that is nonsensical, contains errors or fragments, and/or the like. For example, an OCR error that may occur includes the numeral "1" that is optically imaged and recognized as a lower cased L ("l"). Such errors may be recognized by the systems and methods described herein by analyzing the various classifications of claims (particularly overlapping classifications) and determining inconsistencies. Such inconsistencies can be resolved automatically or manually via user query and/or input. More specifically, the systems and methods described herein are particularly configured to analyze a string of computer-readable text that was generated as the result of OCR, recognize nonsensical characters, errors, fragments, and/or the like based on determinations made from other claims' references, and replace such nonsensical characters, errors, fragments, and/or the like with the original text that appeared in the imaged document and/or append a data file (e.g., an associated XML file) with information regarding the nonsensical characters, errors, fragments, and/or the like. As such, the systems and methods described herein fully support shorter or longer replacements and translate internal text to external text caret positions. One such specific example may be the following text that was translated using an OCR program: "volgens conclusie drie tot vijf", which is recognized by the systems and methods described herein and appended in an associated data file with the following string: "volgens <claim-ref idref="3 4 5">conclusie drie tot vijf</claim-ref>".

The systems and methods described herein can further be used to generate confidence levels that are based on corrections to computer readable text that is incorrectly translated with an OCR program and/or due to drafting errors. For example, if a claim references itself (e.g., "2. The method of claim 2 . . . ") or future claims (e.g., "2. The method of claim 8"), the systems and methods described herein may recognize that such references are incorrect (regardless of whether it is due to incorrectly recognized and OCR translated text or a drafting error) and lower the confidence of the claim and/or a group of claims associated therewith. In addition, the systems and methods can also be used to define a fuzzy detection match and lower the confidence of a claim and/or group of claims when they are not overlapped with a particular rule explicitly described herein.

Referring now to the drawings, FIG. 1 depicts an illustrative computing network that depicts components for a system for determining references in patent claims according to embodiments shown and described herein. As illustrated in FIG. 1, a computer network 10 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 10 may generally be configured to electronically connect one or more computing devices and/or components thereof. Illustrative computing devices may include, but are not limited to, a user computing device 12a, a server computing device 12b, and an administrator computing device 12c.

The user computing device 12a may generally be used as an interface between a user and the other components connected to the computer network 10. Thus, the user computing device 12a may be used to perform one or more user-facing functions, such as receiving one or more inputs from a user or providing information to the user, as described in greater detail herein. Accordingly, the user computing device 12a may include at least a display and/or input hardware, as described in greater detail herein. Additionally, included in FIG. 1 is the administrator computing device 12c. In the event that the server computing device 12b requires oversight, updating, or correction, the administrator computing device 12c may be configured to provide the desired oversight, updating, and/or correction. The administrator computing device 12c may also be used to input additional data into the corpus stored on the server computing device 12b.

The server computing device 12b may receive data from one or more sources, generate data, store data, index data, search data, and/or provide data to the user computing device 12a in the form of search results, visual representations such as claim trees, documents, excerpts from one or more documents, and/or the like.

It should be understood that while the user computing device 12a and the administrator computing device 12c are depicted as personal computers and the server computing device 12b is depicted as a server, these are nonlimiting examples. More specifically, in some embodiments, any type of computing device (e.g., mobile computing device, personal computer, server, etc.) may be used for any of these components. Additionally, while each of these computing devices is illustrated in FIG. 1 as a single piece of hardware, this is also merely an example. More specifically, each of the user computing device 12a, server computing device 12b, and administrator computing device 12c may represent a plurality of computers, servers, databases, components, and/or the like.

Figure 2:
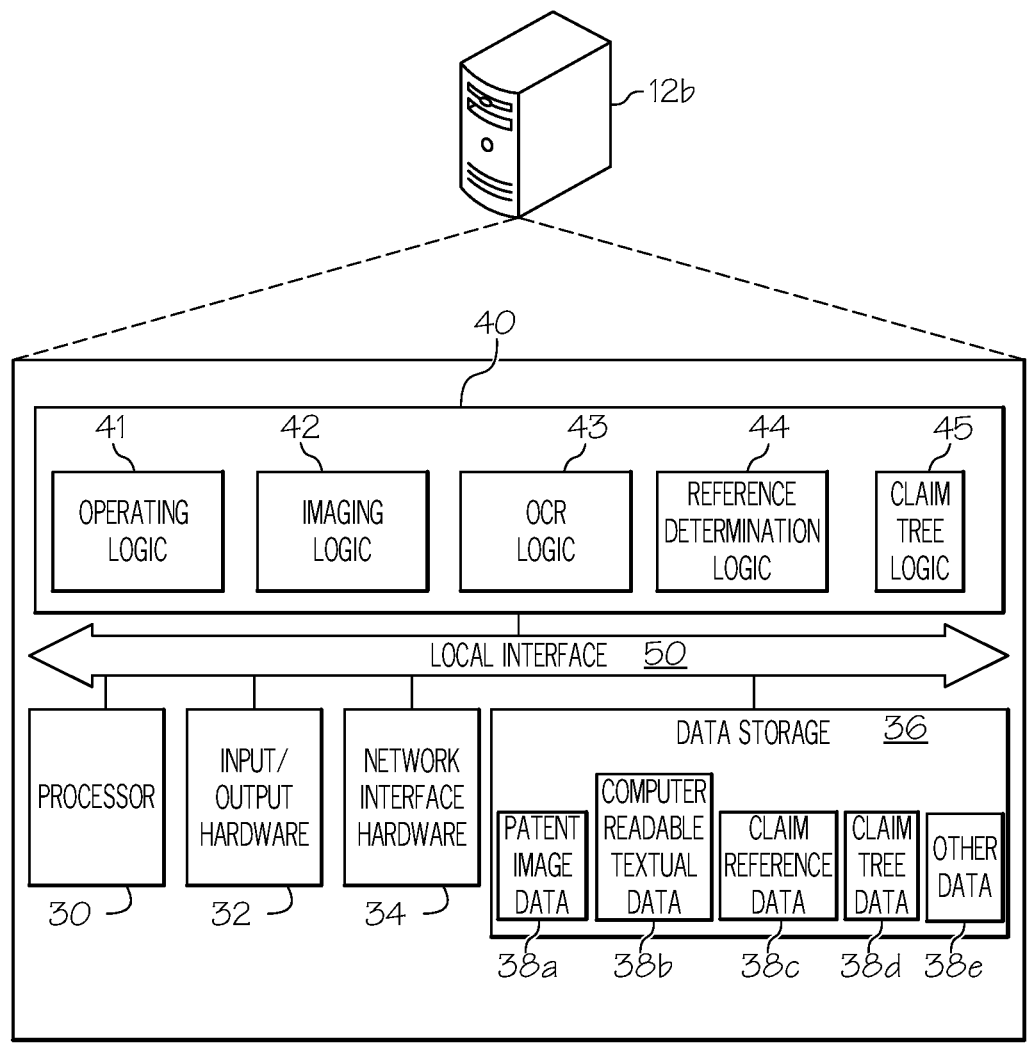
FIG. 2 is a schematic depiction of the server computing device from FIG. 1, further illustrating hardware and software that may be used in determining references in patent claims according to one or more embodiments shown and described herein.

FIG. 2 depicts the server computing device 12b, from FIG. 1, further illustrating a system for receiving data from one or more sources, generating data, storing data, indexing data, searching data, and/or providing data. In addition, the server computing device 12b may include a non-transitory computer-readable medium for searching and providing data embodied as hardware, software, and/or firmware, according to embodiments shown and described herein. While in some embodiments the server computing device 12b may be configured as a general purpose computer with the requisite hardware, software, and/or firmware, in some embodiments, the server computing device 12b may also be configured as a special purpose computer designed specifically for performing the functionality described herein. In embodiments where the server computing device 12b is a general purpose computer, the methods described herein generally improve the functioning of the server computing device 12b by increasing the ability of the server computing device 12b to recognize claim references without additional programming for each language and/or syntax encountered in the claims.

As also illustrated in FIG. 2, the server computing device 12b may include a processor 30, input/output hardware 32, network interface hardware 34, a data storage component 36 (which may store patent image data 38a, computer readable textual data 38b, claim reference data 38c, claim tree data 38d, and other data 38e), and a non-transitory memory component 40. The memory component 40 may be configured as a volatile and/or a nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store various processing logic, such as operating logic 41, imaging logic 42, OCR logic 43, reference determination logic 44, and/or claim tree logic 45 (each of which may be embodied as a computer program, firmware, or hardware, as an example). A local interface 50 is also included in FIG. 2 and may be implemented as a bus or other interface to facilitate communication among the components of the server computing device 12b.

The processor 30 may include any processing component configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12b and may be configured to store one or more pieces of data and selectively provide access to the one or more pieces of data. As illustrated in FIG. 2, the data storage component 36 may store patent image data 38a, computer readable textual data 38b, claim reference data 38c, claim tree data 38d, and/or other data 38e, as described in greater detail herein.

Included in the memory component 40 are the operating logic 41, the imaging logic 42, the OCR logic 43, the reference determination logic 44, and/or the claim tree logic 45. The operating logic 41 may include an operating system and/or other software for managing components of the server computing device 12b. The imaging logic 42 may obtain one or more images of a patent document (e.g., pages of a physical patent document that are scanned). The OCR logic 43 may recognize text from patent document images and convert the text to computer-readable text (i.e., generate computer-readable text from the patent document images). The reference determination logic 44 may determine one or more claim references for each of one or more claims within a patent document using the computer-readable text, as described in detail below. The claim tree logic 45 may generate a claim tree that is based on the determined claim references, as described in greater detail herein.

It should be understood that the components illustrated in FIG. 2 are merely illustrative and are not intended to limit the scope of this disclosure. More specifically, while the components in FIG. 2 are illustrated as residing within the server computing device 12b, this is a nonlimiting example. In some embodiments, one or more of the components may reside external to the server computing device 12b. Similarly, while FIG. 2 is directed to the server computing device 12b, other components such as the user computing device 12a and the administrator computing device 12c may include similar hardware, software, and/or firmware.

Figure 3:
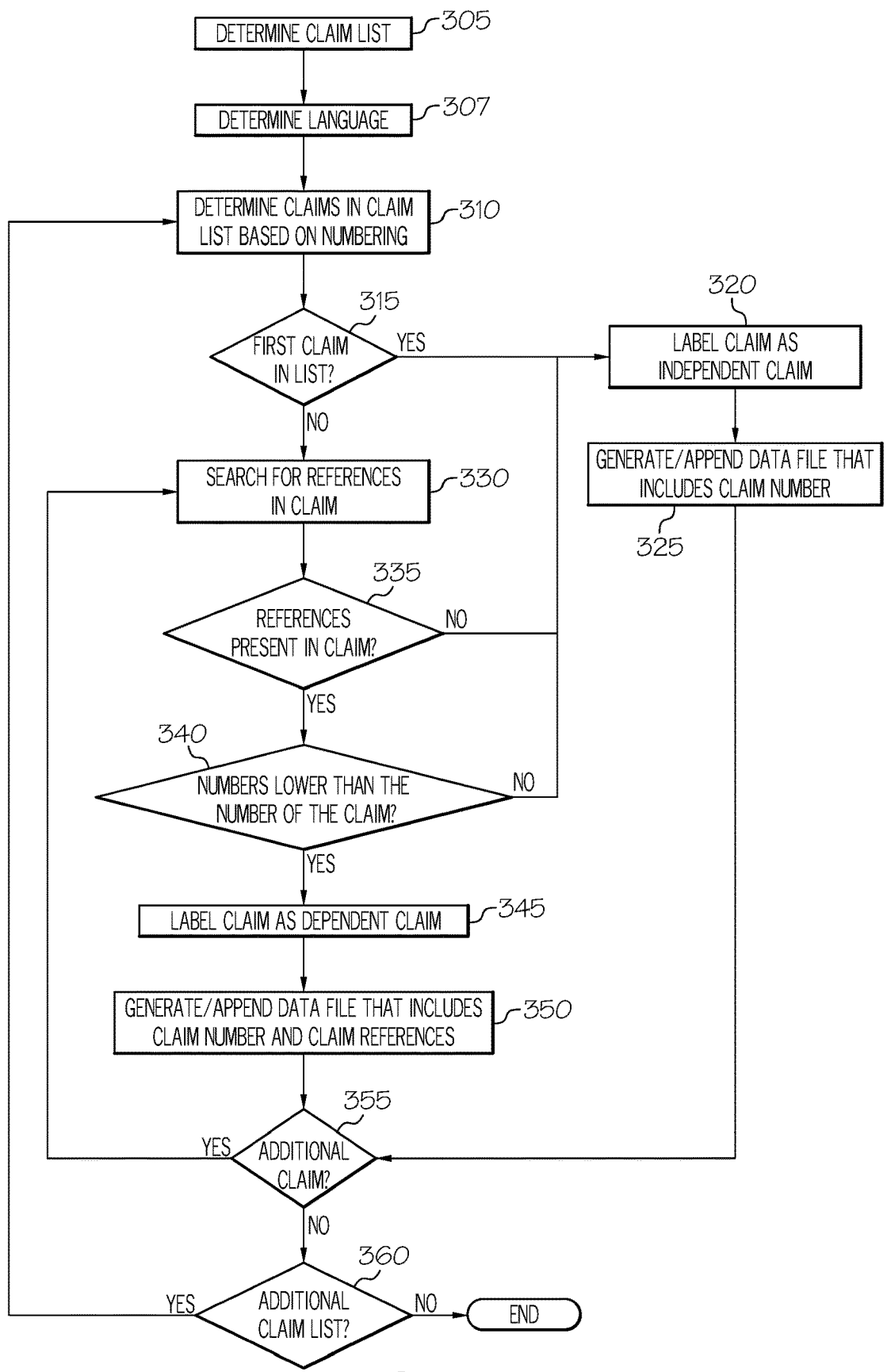
FIG. 3 depicts a flow diagram of an illustrative method of parsing computer-readable text to determine the patent claims according to one or more embodiments shown and described herein.

The various processes described herein may generally require a recognition of the patent claims of a patent document. As such, the patent document are parsed to determine the patent claims therein. An illustrative method of parsing the computer-readable text to determine the patent claims is depicted in FIG. 3. In addition to determining whether the computer-readable text contains patent claims, the method described with respect to FIG. 3 may also be used to determine a claim number and one or more references for each of the patent claims within the computer-readable text.

In some embodiments, in order to obtain computer readable text, a patent document may be imaged and/or translated via an OCR program into computer readable text. Such processes should be generally understood and are not described in further detail herein. Various portions of the server computing device 12*b* depicted in FIG. 2 may be used to obtain computer readable text, including, but not limited to, the imaging logic 42, and/or the OCR logic 43. In addition, data may be accessed and/or stored in various portions of the data storage component 36, including, but not limited to, the patent image data 38*a*, and/or the computer readable textual data 38*b*.

More specifically, in embodiments where data corresponding to the one or more images of the patent claims is obtained, such data may be obtained, for example, from the patent image data 38*a* and/or from an imaging device such as a scanner, a camera, or the like. Illustrative data may include image files, such as TIFF image files, JPG/JPEG image files, GIF image files, BMP image files, PDF image files, or the like. The one or more images may further be converted to computer readable text using an OCR program or module, such as various OCR programs or modules now known or later developed. The resulting computer readable text may be stored in the data storage component 36 as the computer readable textual data 38*b* (FIG. 2) and may further be parsed to determine the patent claims, as described in greater detail herein.

In embodiments where data that contains computer-readable text corresponding to the patent claims is obtained, such data may be obtained, for example, from the computer readable textual data 38*b* (FIG. 2) and/or other data obtained from a local and/or remote database. The computer-readable text may be parsed to determine the patent claims, as described in greater detail herein.

Still referring to FIG. 3, a claim list may be determined at step 305. A claim list is generally a section of a patent document containing the patent claims. Each claim is appended with a number identifying that claim. As such, the claim list may be a numbered list, where each claim in the list has a number that is distinct from the other claim in the list. The number of claims in the claim list can be any number greater than zero. That is, the claim list may have 1, 2, 3, 4, 5, 6, 7, 8, 9, 10, or greater claims. In some embodiments, the number of claims may be set by the jurisdiction from which the patent document comes (e.g., a statutory limit on the number of claims), financial considerations (e.g., claims are limited due to excess claim fees that are imposed), and/or the like.

Determination of the claim list may also include parsing the text of the document for numeric symbols, such as, for example, European/West Arabic natural numbers (1, 2, 3, etc.), Roman numerals (I, II, III, etc.). Arabic numerals (١،٢،٣, etc.), formal Chinese numerals (壹, 貳叁叁 etc.), Korean numerals (일 이 삼, etc.), and/or the like, particularly numeric symbols that are arranged into an ordered list. However, since a patent document may only contain a single patent claim, a patent document may contain lists of numeric symbols for other reasons (e.g., a specification may refer to an ordered list or may have numbered paragraphs), and/or the like, such a determination of the claim list may account for other factors that are indicative of whether the discovered numeric symbols are indeed patent claims. In a nonlimiting example, the determination may further include determining whether a particular symbol precedes the numeric symbol (e.g., a period, a comma, a colon, a bracket, or the like, as well as combinations thereof). In another nonlimiting example, the determination may further include determining whether the numeric symbol precedes the word "claim" (or a translation thereof) within a particular number of characters or words. That is, a determination may be made as to whether the word "claim" or translation thereof) appears within 10 characters, 15 characters, 20 characters, or the like after the numeric symbol. In yet another nonlimiting example, the determination may further include determining whether a particular indicator of a claims section precedes the numeric symbol(s). That is, the determination may include searching for text and/or other document characteristics that immediately precedes the first numeric symbol and determining whether such text or document characteristics are indicative of a claims section. For example, illustrative text may include, but is not limited to "Claims," "Claims Listing," "Amendments to the Claims," "What is claimed," "I claim," and/or the like. In another example, illustrative document characteristics may include, but are not limited to, font formatting that is different from the font used in the remainder of the document, paragraph formatting that is different from the paragraph formatting used in the remainder of the document, a page break, a section break, and/or the like.

Determination of the claim list may further include determining where a particular claim list begins and ends. That is, such a determination may parse the text and place a marker indicating the beginning of the first claim in the claim list (e.g., the first claim in an ordered list, a claim associated with a first number indicator such as 1, and/or the like) and place a marker indicating the end of the last claim in the list. The marker indicating the end of the last claim in the list may generally be placed at or after the last indicator of a claim (e.g., a period or the like) in the claim list, which may be, for example, after the last claim in an ordered list of claims, after the last claim associated with the highest number present in the claims, and/or the like. Such an indicator is not limited by this disclosure, and may generally include a code (such as a metadata tag or the like) in a corresponding data file (e.g., an XML file) that can be used by a computing device to recognize the beginning and/or end of the claim list. In some embodiments, the indicator may be provided as a bookmark or the like by an authority.

At step 307, the language of the claims in the claim list may be determined. That is, in some embodiments, an indicator of the language of the claims in the claim list may be provided in the document metadata and thus the determination may be made by analyzing the metadata. In other embodiments, the text of the claims may be analyzed to determine the type of characters used in the claims (e.g., Latin characters, Cyrillic characters, simplified Chinese characters, traditional Chinese characters, etc.), a language based on the words that are used in the claims (e.g., recognizing that the word "aparato" is the Spanish word for "apparatus," which may potentially be indicative of claims that are written in the Spanish language), sentence structure that is only present in a particular language, and/or the like. Other means of recognizing the language of the claims may also be used without departing from the scope of the present disclosure.

At step 310, the claims in the claim list may be determined. That is, a determination may be made as to the number of claims (including their numbering) and the order of the claims. Such a determination may generally be made by parsing the text of each claim, determining a number associated with the claim (e.g., a first claim in the claim list may have the number 1 associated therewith, the second claim in the claim list may have the number 2 associated therewith, etc.), and determining where each claim begins and ends. Such a determination may further include placing a marker indicating the beginning of each claim in the claim list and placing a marker indicating the end of each claim in the claim list. The markers indicating the beginning and end of the each claim in the claim list may generally be placed before or at a first indicator of a claim (e.g., a numerical indicator) and at or after the last indicator of the same claim (e.g., a period or the like), respectively. Such an indicator is not limited by this disclosure, and may generally include a code (such as a metadata tag or the like) in a corresponding data file (e.g., an XML file) that can be used by a computing device to recognize the beginning and/or end of each claim in the claim list.

At step 315, a determination may be made as to whether each claim is the first claim in the list. Such a determination may be completed by determining the claim number associated with the claim, determining whether the claim references another claim, and/or determining whether the claim is adjacent to a marker indicating the beginning of the claim list. In general, the first claim in the list will be associated with the number 1 or the like, may be associated with the lowest number of all of the claims in the list, and/or may not contain any references to another claim (i.e., because the claim is an independent claim) and may contain a tag (e.g., a metadata tag) identifying the start of a claim set and/or the first claim. Since only one claim can be the first claim in the list, such a determination may end as soon as the first claim is identified.

If the claim is the first claim in the list, it may be labeled as an independent claim at step 320. This is because the first claim in an ordered list of patent claims will always be an independent claim. Labeling the claim may include, for example, generating data indicating that the claim is an independent claim, such as creating a metadata tag or the like that is appended to the text of the claim list. In addition to labeling the claim, a data file may be generated or appended at step 325. Such a data file generally indicates the claim, the number associated therewith, and its status as an independent claim. The data file may be later accessed for the purposes of creating a claim tree, as described in greater detail herein. In some embodiments, the data file may be a new or existing XML file for the claim, where the XML file is amended/appended to include the labeling information. The process may continue to step 355, as described in greater detail herein.

For each claim that is determined not to be the first claim in the list, the process may continue at step 330 by searching for at least one reference (e.g., other numbers) located in the claim. That is, the text of the claim may be parsed in order to determine whether it contains a reference to another claim, and if so, which claim it references. Such a search may generally look for words, phrases, or the like that are indicative of a claim reference, such as, but not limited to, "of claim 1," "according to claim 1," "according to the first claim," "of any of the previous claims" "according to claims 1-5," or the like. It should be noted that a claim merely containing a number within the text thereof is not necessarily indicative of a reference to another claim without additional text indicating a reference. This is because some claims may reference other claims without including a claim number (e.g., "any of the preceding claims") or may contain certain numbers therein that are not claim references (e.g., a claim that recites the phrase "about 1 mm" where the "1" refers to a measurement rather than a reference to claim 1). Specific examples of certain claim references are shown in Table 2 below:

TABLE 2

| Claim Language | References |
| --- | --- |
| "16. According to claim 1, 3 to 5, and 13 to 15, wherein said . . . " (English) | Claim references for claim 16 are 1, 3, 4, 5, 13, 14, and 15. |
| "10.제 1 항 또는 제 3 항, 제 6 항 또는 제 7 항 중 어느 한 항에 있어서" (Korean) | Claim references for claim 10 are 1, 3, 6, and 7. |
| "5. παραπάνω αξιώσεις (1,2,3 & 4) μπορούν" (Greek) | Claim references for claim 5 are 1, 2, 3, and 4. |

At step 335, if other references are not present in the claim, the claim may be labeled as an independent claim at step 320 and a data file may be generated/appended at step 325, as previously described herein. The process may continue to step 355 as described in greater detail herein.

If other references are present in the claim, a further verification step may be completed to ensure that the references are in fact proper references (i.e., referencing an earlier appearing claim in the ordered list of claims), thereby further indicating whether the claim is an independent or a dependent claim. That is, a claim cannot reference itself or a claim that appears subsequently in the ordered list. As such, a determination may be made at step 340 whether the reference (e.g., the numbers in the reference) are lower than the number of the claim. That is, the determination may include determining the number from the reference, determining the number of the instant claim, and comparing the respective numbers to ensure that the number from the reference is lower than the number of the instant claim. For example, if a particular claim is claim 4, it may appropriately reference claim 1, claim 2, and/or claim 3 (including language such as "any of the preceding claims" or the like). Claim 4 may not appropriately reference claim 5, claim 6, claim 7, etc.

If the claim does not contain references lower than the number of the claim, the claim is labeled as an independent claim at step 320, a data file is generated/appended, and the process continues to step 355, as described in greater detail herein. It is contemplated that the claim may not contain references lower than the number of the claim due to an error in OCR translation, a typographical error, or the like. In such instances, the claim may contain an indicator or the like that relates to the errant reference(s) such that the claim is relabeled as a dependent claim upon further analysis of the claim, as described in greater detail herein.

If the claim does contain references that are lower than the number of the claim, the claim may be labeled as a dependent claim at step 345. Labeling the claim may include, for example, generating data indicating that the claim is a dependent claim, such as creating a metadata tag or the like that is appended to the text of the claim list. In addition to labeling the claim, a data file may be generated or appended at step 350. Such a data file generally indicates the claim, the number associated therewith, and its status as an independent claim. In some embodiments, the data file may be an existing XML file for the claim, where the existing XML file is updated with the labeling information. For example, the phrase "according to claim 1 the" may be marked up with the following: "according to <i>clai<u><b>m</b>1</u></i> the," which becomes "according to <i><claim-ref idref="1">clai<u><b>m</b>1</u></claim-ref></i> the" after step 350. The data file may be later accessed for the purposes of creating a claim tree, as described in greater detail herein. The process may then continue to step 355.

To ensure all of the claims are analyzed as described herein with respect to FIG. 3, a determination may be made at step 355 as to whether additional claims exist in the claim list. If so, the process may repeat at step 330. If no additional claims exist, a determination may be made at step 360 as to whether another claim list exists. For example, certain patent documents may contain multiple claim lists (e.g., a patent document may contain a claim list for each of a plurality of translations of a set of claims; a plurality of claim lists that are each particularly worded or otherwise formatted to comply with a particular jurisdiction's requirements; and a claim list for each iteration of a set of claims, such as originally filed claims, amended claims, allowed claims, and issued claims). That is, a patent document may include, for example, a first claim list that is particularly worded/formatted for the United States and contains 3 independent claims and 17 dependent claims, none of which are multiple dependent claims; and a second claim list that is particularly worded/formatted for Europe and contains one independent claim and 14 dependent claims, some of which are multiple dependent.

If only a single claim list exists, the process may end. Conversely, if a plurality of claim lists exists, the process may return to step 310 to be completed for each subsequent claim list of the plurality of claim lists.

Figure 4:
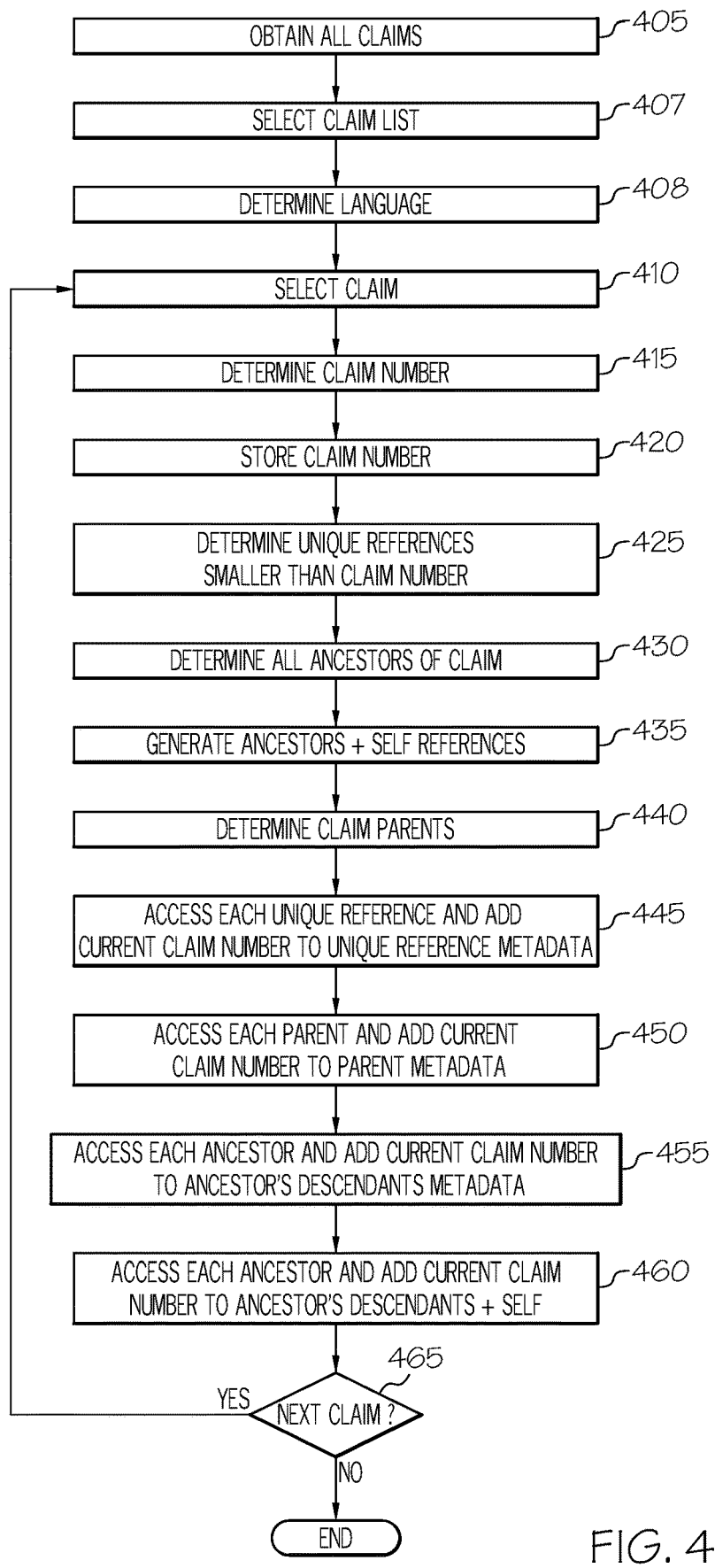
FIG. 4 depicts a flow diagram of an illustrative method of determining references in patent claims according to one or more embodiments shown and described herein.

FIG. 4 depicts a block diagram of an illustrative method of determining references in patent claims. At step 405, all of the patent claims in a particular document that are to be analyzed may be obtained. That is, every patent claim may be obtained or a subset of the patent claims may be obtained. Obtaining the patent claims may include, for example, obtaining data that contains computer-readable text corresponding to the patent claims and the corresponding data file, and/or the like.

In embodiments where the claims contain multiple claim sets, a particular claim set may be selected at step 407. That is, a first claim set may be selected from a plurality of claim sets, and the subsequent processes described hereinbelow with respect to FIG. 4 may be completed for that claim set. The processes may then be repeated for each subsequently selected claim set.

At step 408, the language of the claim list may be determined. That is, in some embodiments, an indicator of the language of the claims in the claim list may be provided in the document metadata and thus the determination may be made by analyzing the metadata. In other embodiments, the text of the claims may be analyzed to determine the type of characters used in the claims (e.g., Latin characters, Cyrillic characters, simplified Chinese characters, traditional Chinese characters, etc.), a language based on the words that are used in the claims (e.g., recognizing that the word "aparato" is the Spanish word for "apparatus," which may potentially be indicative of claims that are written in the Spanish language), sentence structure that is only present in a particular language, and/or the like. Other means of recognizing the language of the claims may also be used without departing from the scope of the present disclosure.

At step 410, a claim from the set of claims may be selected for analysis. In some embodiments, selection of a particular claim may include selecting the first claim from the ordered list of claims or selecting the next claim to be analyzed (if previous claims have already been analyzed).

The claim number may be determined at step 415 and stored at step 420. Determining the claim number may generally include parsing the text to find a marker indicating the beginning of the claim and/or parsing the corresponding data file (as previously described herein) and determining the claim number associated with that claim. For example, if a claim marker is located immediately prior to the number 3, the determination may be that the claim undergoing an analysis is claim number 3. As also previously described herein, the claim number may be stored as a data file. The data file may be stored, for example, in various portions of the data storage component 36 (such as the computer readable textual data 38b, the other data 38e, and/or the like). Step 420 may be codified and algorithmic format as "Store CurrentClaimNumber".

At step 425, the unique references that are smaller than the claim number may be determined from each claim. That is, the data relating to the claim (e.g., the data file for the claim that is created or appended according to steps 325 or 350 of FIG. 3) may be retrieved and analyzed to determine whether the claim contains references that are smaller than the claim number. For example, if the determined claim number is 5, it may have unique references of 1, 2, 3, and/or 4, which correspond to claims 1-4, respectively. Step 425 may be codified in algorithmic form as "Calculate ClaimReferences".

At step 430, all of the ancestors of the claim may be determined. An ancestor of a particular claim is generally a claim that is either directly or indirectly referenced by the particular claim. For example, if a set of claims includes claims 1-5 and claim 2 references claim 1 (e.g., "2. The method of claim 1 . . . ") and claim 5 references claim 2 (e.g., "5. The method of claim 2") then the ancestors of claim 5 are claims 1 and 2 because they are both referenced by claim 5 (claim 2 is directly referenced and claim 1 is indirectly referenced). Table 3 below provides another illustrative example of claim references and ancestors:

TABLE 3

| Claim | References | Ancestors |
|---|---|---|
| 1 | | |
| 2 | 1 | 1 |
| 3 | 2 | 1, 2 |
| 4 | 1, 2, 3 | 1, 2, 3 |
| 5 | 4 | 1, 2, 3, 4 |

Determining the ancestors of the claim according to step 430 may further include storing information relating to the claim and its ancestors (e.g., ancestral data). For example, as described in greater detail herein, an associated data file (e.g., an XML file) may be generated or appended to record the claim and the associated references. Such a data file may be stored, for example, as claim reference data 38c (FIG. 2). Step 430 may be codified in algorithmic format as "Calculate ClaimAncestors". The corresponding data file may further be generated or appended to add a self reference of the claim (e.g., self referential data) to the ancestor information at step 435. As such, the data file may identify the claim and all associated ancestors of that claim. Step 435 may be codified in algorithmic format as "Calculate ClaimAncestorsAndSelf".

At step 440, the parents of the claim may be determined. The parents of the claims generally refer to one or more immediate ancestors of a claim. That is, referring to Table 2, the parent of claim 5 is claim 4, the parents of claim 4 are claim 1, 2, or 3, the parent of claim 3 is claim 2, and the parent of claim 2 is claim 1. Claim 1 contains no parents because it is an independent claim and has no ancestors. As such, all parent claims are ancestors, but all ancestors are not necessarily parent claims. As a portion of determining the claim parents according to step 440, a temporary list of the claim references may be created in descending order such that the claim parents can be cross-checked with the claim references. That is, each claim in the temporary claim references may be visited to verify whether it is actually a member of a claim parents list of a particular claim, thereby optimizing the claim parents list for each of the claims. If the claim is in fact a true parent of another claim, it may be removed from the list of claim ancestors for that other claim such that each claim has two distinct lists: one list containing claim ancestors that are not parents, and a second list containing parents. Such a cross-checking may also be used to verify and correct OCR translation errors. Step 440 may be codified in algorithmic format as "Calculate ClaimParents".

For each unique claim that is referenced by a particular claim (but not a parent), a data file may be added or appended for that unique claim to add the claim number of the particular claim (e.g., inserting cross-reference data indicating the relationship) at step 445. That is, if a claim set includes claims 1, 2, and 3, where claim 3 references claim 2 and claim 2 references claim 1, a data file for claim 1 may be added or appended to include metadata relating to claim 3. However, the data file for claim 2 would not be added or appended in this step because claim 2 is a parent of claim 3. Step 445 may be codified in algorithmic form as "Initialize ClaimReferencedBy empty and Update ClaimReferencedBy".

Similarly, for each parent claim that is referenced by a particular claim, a data file may be added or appended for that parent claim to add the claim number of the particular claim (e.g., inserting cross-reference data indicating the relationship) at step 450. That is, if a claim set includes claims 1, 2, and 3, where claim 3 references claim 2 and claim 2 references claim 1, a data file for claim 1 may be added or appended to include metadata relating to claim 2 and a data file for claim 2 may be added or appended to include metadata relating to claim 3. Step 450 may be codified in algorithmic form as "Initialize ClaimChildren empty and Update ClaimChildren".

At step 455, for each ancestor of the particular claim (including parents), a data file may be added or appended for that ancestor claim to add the claim number of the particular claim to a field for references to all of the ancestor's descendants, as previously described herein. That is, if a claim set includes claims 1, 2, and 3, where claim 3 references claim 2 and claim 2 references claim 1, a data file for claim 1 may be added or appended to include metadata relating to claims 2 and 3 as the ancestors thereof. Step 460 may be codified in algorithmic form as "Initialize ClaimDescendants empty and Update ClaimDescendants".

At step 460, for each ancestor of the particular claim (including parents), a data file may be added or appended for that ancestor claim to add the claim number of the particular claim to a field for references to all of the ancestor's descendants as well as the ancestor's own claim number, as previously described herein. That is, if a claim set includes claims 1, 2, and 3, where claim 3 references claim 2 and claim 2 references claim 1, a data file for claim 1 may be added or appended to include metadata relating to claims 2 and 3 as the ancestors thereof and claim 1 as a self reference. Step 460 may be codified in algorithmic form as "Initialize ClaimDescendantsAndSelf with CurrentClaimNumber and Update ClaimDescendantsAndSelf".

The process described with respect to FIG. 4 may repeat for every claim in a claim set to ensure that they are appropriately labeled with metadata and/or a reference file is appropriately created/appended. As such, at step 465, a determination may be made as to whether there is a next claim. If so, the process may return to step 410. If not, the process may end for the claim set.

Figure 5A:
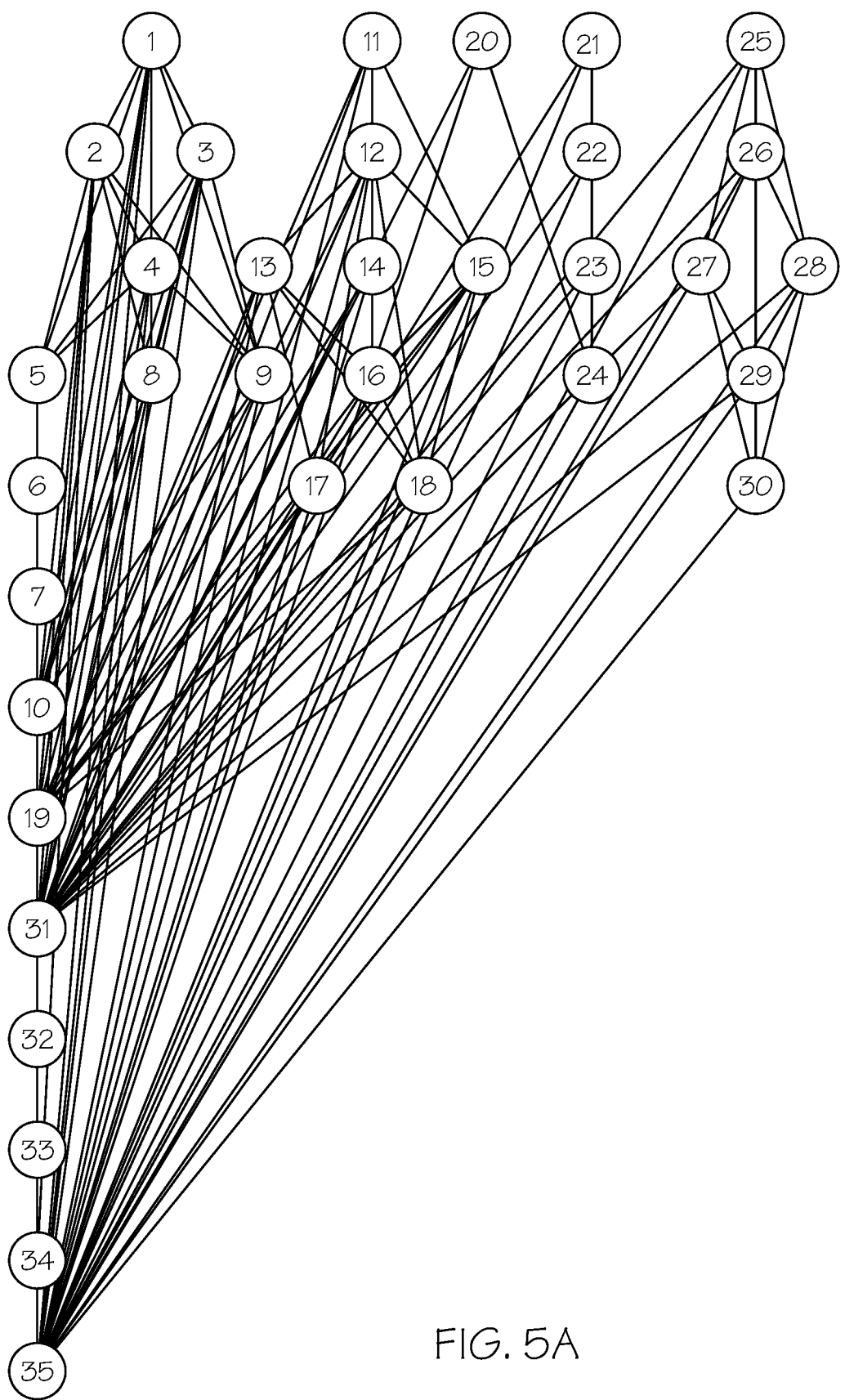
FIG. 5A schematically depicts an illustrative claim tree according to one or more embodiments shown and described herein.
Figure 5B:
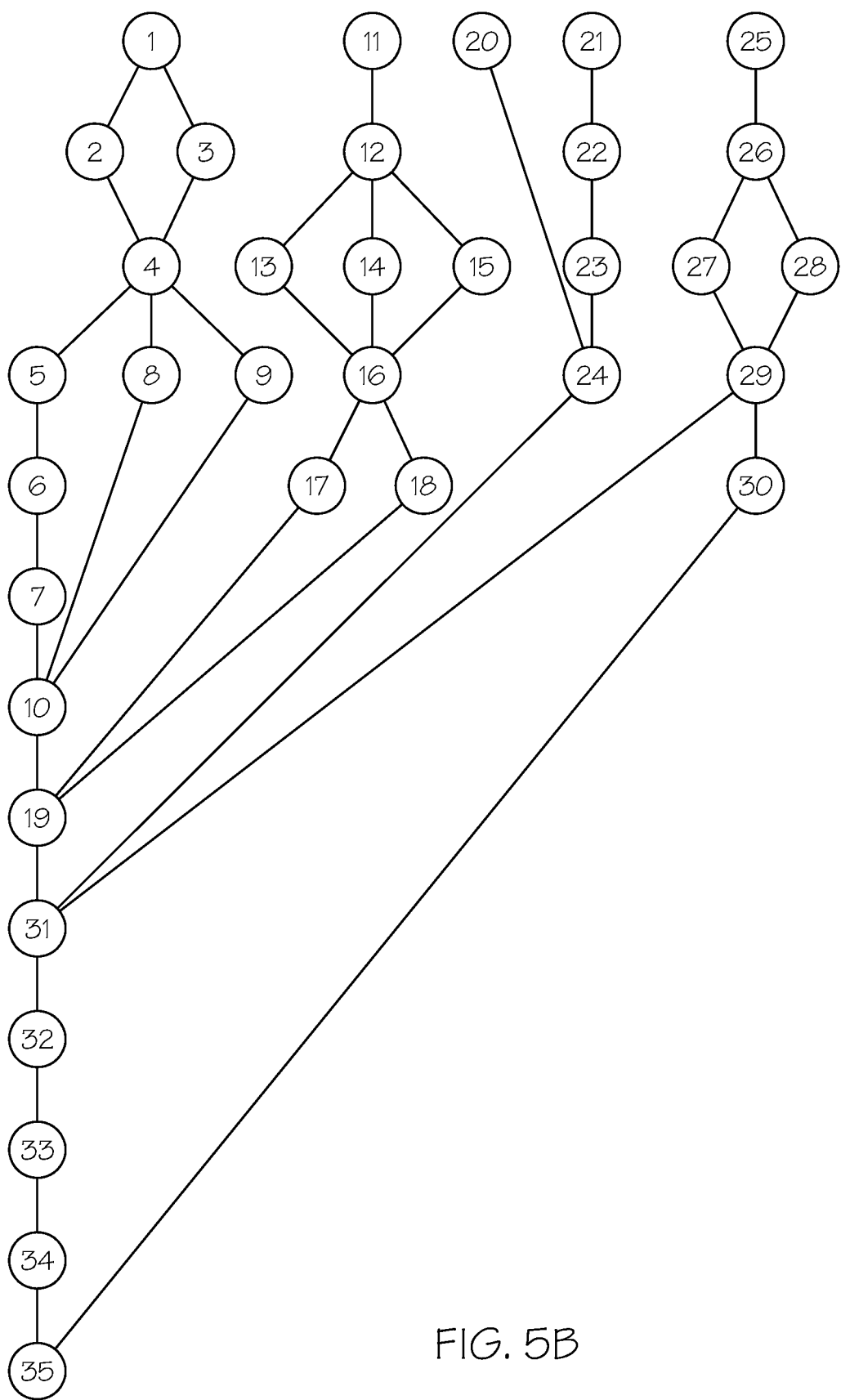
FIG. 5B schematically depicts an illustrative streamlined claim tree according to one or more embodiments shown and described herein.

All of the information that is generated from the claims as described herein may then be used to create a streamlined claim tree that allows a user to visualize relationships between claims is a more streamlined manner. A typical claim tree is depicted in FIG. 5A. Independent claims 1, 11, 20, 21, and 25 are shown at the top of FIG. 5A, and dependent claims 2-35 are shown below. Lines between claims indicate references. For example, claims 14, 16, and 24 each depend from claim 20, and thus a line is drawn between claim 20 and each of claims 14, 16, and 24. However, the large number of claim dependences/references results in a large number of lines, which makes it difficult to visualize the interconnectedness of claims. For example, certain lines between claims overlap with other lines and/or travel behind claim numbers, so it can be difficult to discern where a particular line begins and ends (e.g., the line that runs between claims 1 and 19 passes behind claim 13 and overlaps with several other lines). As such, the systems and methods described herein may provide a streamlined claim tree as shown in FIG. 5B that makes it easier to visualize relationships between claims. The streamlined claim tree can be generated using the data that was generated and stored as described herein with respect to FIGS. 1-4, and may be useful for claims where references to multiple inherent claims is allowed/permissible.

Figure 6:
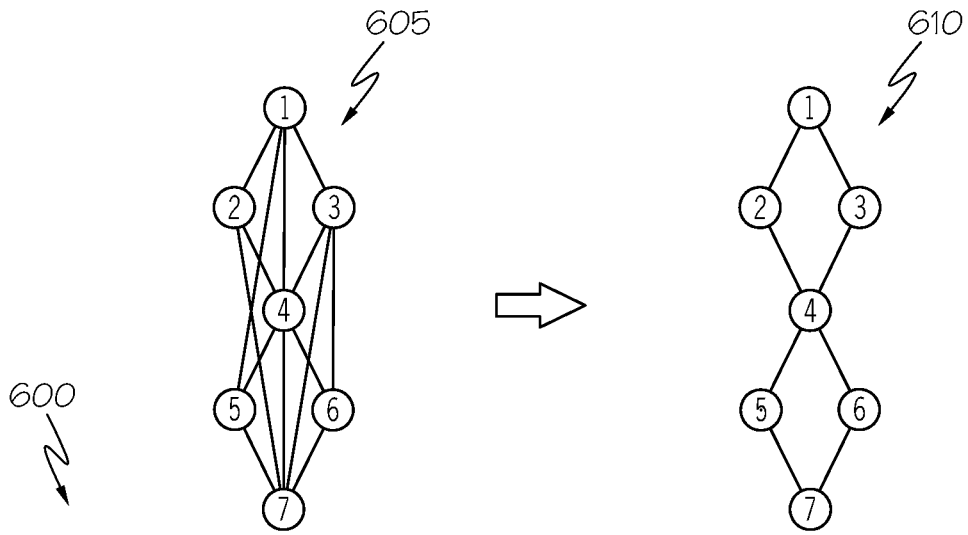
FIG. 6 schematically depicts an illustrative process of streamlining a claim tree according to one or more embodiments shown and described herein.

FIG. 6 is a schematic depiction of a process of streamlining a claim tree according to an embodiment. As shown in the chart 600, an example claim set has 7 claims, where claim 1 is independent and claims 2-7 are dependent. Claims 2 and 3 only reference claim 1 (e.g., "The method according to claim 1"), claim 4 reference claims 2 and 3 (e.g., "The method according to claim 2 or 3"), claim 5 references claims 1 and 4 (e.g., "The method according to claims 1 and 4"), claim 6 references claims 3 and 4 (e.g., "The method according to claim 3 or 4"), and claim 7 references claims 2-6 (e.g., "The method according to any one of the preceding claims"). Because claim 1 is independent, the "ClaimReferences" field, the "ClaimParents" field, and the "ClaimAncestors" field are blank; claim 1 is provided in the "ClaimAncestorsAndSelf" field because claim 1 does not have any ancestors; claims 2, 3, 5, and 7 are provided in the "ClaimReferencedBy" field because each of those claims directly references claim 1 (i.e., claims 4 and 6, while indirectly depending from claim 1 by virtue of depending from other claims depending from claim 1, do not directly reference claim 1); claims 2 and 3 are provided in the "ClaimChildren" field because claims 2 and 3 are the direct descendants of claim 1 (i.e., while claim 7 references claim 1, it is not a child since it also references claims 2 and 3); claims 2-7 are provided in the "Claim Descendants" field because each of claims 2-7 depends from claim 1, either directly or indirectly; and claims 1-7 are provided in the "ClaimDescendantsAndSelf" field because such a field includes all of the descendants of claim 1 and claim 1 itself.

To generate the streamlined claimed tree 610 from a standard claim tree 605, the systems and methods described herein may use the various fields to determine which claims are being referenced directly (e.g., "ClaimReferences"), which claims are being referenced indirectly (e.g., "ClaimAncestors"-"ClaimReferences"), which claims directly reference a selected claim (e.g., "ClaimReferencedBy"), and/or which claims indirectly reference a selected claim (e.g., "ClaimDescendants"-"ClaimReferencedBy". As a result, the streamlined claim tree removes the direct line between non-parent ancestors of a claim, instead indicating a connection between such non-parent ancestors and the claim with two or more lines (e.g., a first line between the claim and a parent claim and a second line between the parent claim and a grandparent claim).

Table 4 provides another illustrative claim chart that is similar to the chart 600 described above:

TABLE 4

| CurrentClaimNumber | ClaimReferences | ClaimAncestors | ClaimReferencedBy | ClaimDescendants |
|---|---|---|---|---|
| 1 | | | 2 | 2, 3, 4, 5 |
| 2 | 1 | 1 | 3 | 3, 4, 5 |
| 3 | 2 | 1, 2 | 4 | 4, 5 |
| 4 | 3 | 1, 2, 3 | 5 | 5 |
| 5 | 4 | 1, 2, 3, 4 | | |

According to the claim chart in Table 4, claim 3 directly references claim 2, indirectly references claim 1, is directly referenced by claim 4, and is indirectly referenced by claim 5.

Figure 7:
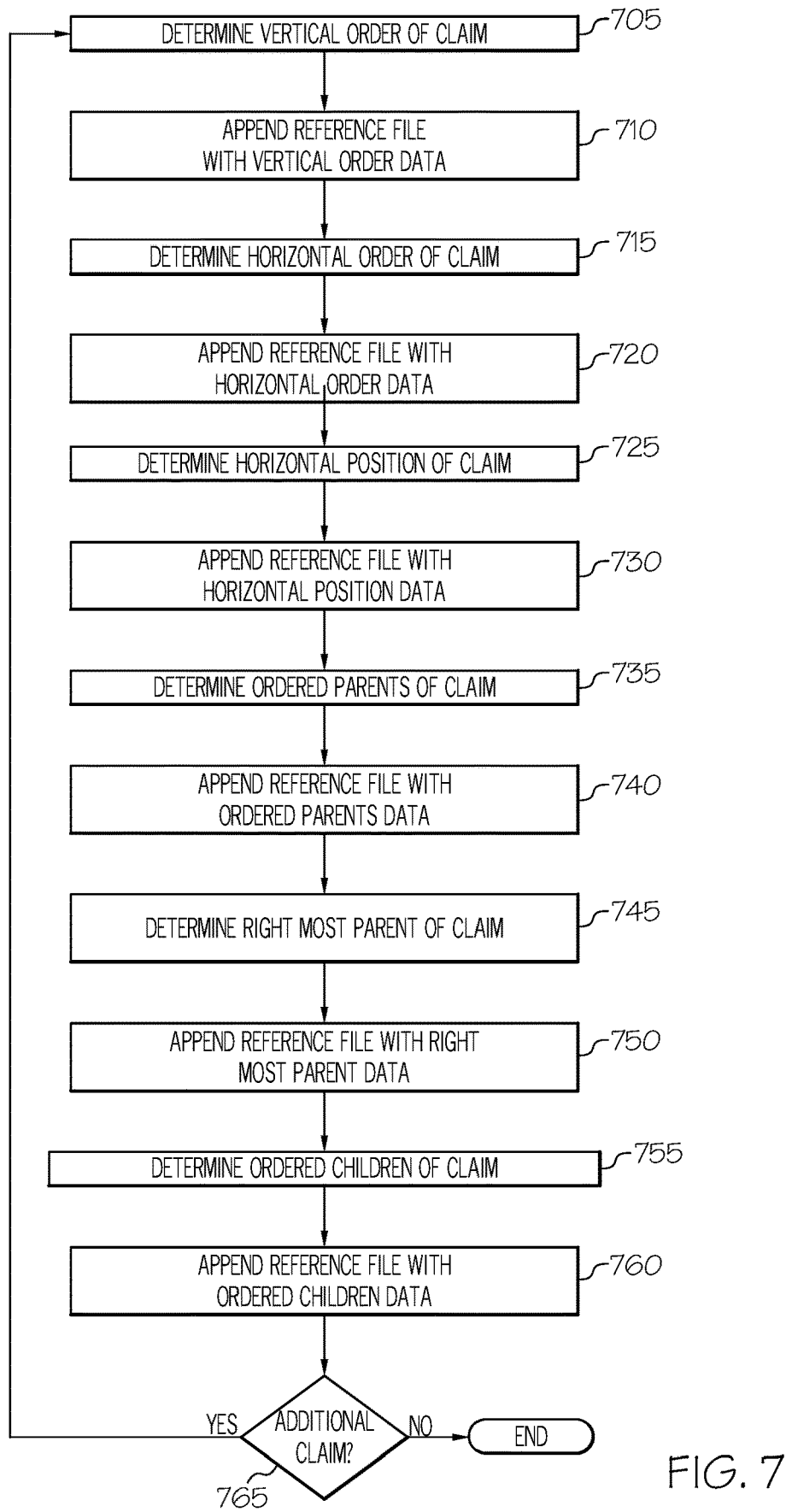
FIG. 7 depicts a flow diagram of an illustrative method of generating a claim tree according to one or more embodiments shown and described herein.

Referring now to FIG. 7, a process of generating a streamlined claim tree includes determining positioning of each of the claim indicators in the streamlined claim tree. For the purposes of explaining FIGS. 7-10, it should be understood that the term "claim" may refer to an actual patent claim or a claim indicator in the streamlined claim tree (e.g., a claim number with a circle around it or the like).

At step 705, a vertical order ("VerticalOrder") of a claim is determined. The vertical order of the claim generally refers to the positioning of the claim in the vertical sense. For example, an independent claim may be have a vertical order such that an identifier of that claim appears at a top portion of a claim tree and any identifier for dependent claims thereof appear below the identifier for the independent claim. It should be understood that the identifier for the independent claim being located at the top portion of the claim tree is merely illustrative and can be in another location depending on the orientation of the claim tree. For example, the identifier for the independent claim may be at the side of the claim tree, at the bottom of the claim tree, or another location. The vertical positioning (i.e., "VerticalPosition") of the claim is not needed for the purposes of creating the streamlined claim tree, as each vertical plane is drawn on a fixed offset, as described in greater detail herein. At step 710, a reference file for the streamlined claim tree (e.g., an XML file or the like) may be generated or appended with data corresponding to the vertical order of the claim.

In addition to the vertical order of a claim, a horizontal order ("HortizontalOrder") of the claim may be determined at step 715 and the reference file may be appended with the corresponding horizontal order data at step 720. The horizontal order generally refers to the order in which the claims are horizontally drawn on the same vertical order plane. The horizontal order may allow for an ability to reorder claims so as to minimize the number of overlaps between connector lines.

At step 725, the horizontal position ("HorizontalPosition") of the claim may be determined and the reference file may be appended with the corresponding horizontal position data and stored at step 730. The horizontal position generally refers to an absolute horizontal position of where the claim will be placed on the streamlined claim tree.

At step 735, the ordered parents ("OrderedParents") of the claim may be determined and the reference file may be appended with the corresponding ordered parents data and stored at step 740. The ordered parents of the claim refer to the parents of the claim (if any) that are to be located one vertical order upwards from the claim and ordered by their respective horizontal orders.

If the claim has a parent, the right most parent ("RightMostParent") of that claim may be determined at step 745. In addition, the reference file may be appended with the corresponding right most parent data and stored at step 750. The right most parent generally refers to the last item of the ordered parents. As such, the right most parent may generally correspond to a parent having the highest claim number. In embodiments where the claim only has a single parent, the right most parent will always be the single parent.

If the claim has a child, a determination of the ordered children ("OrderedChildren") of the claim may be completed at step 755. In addition, the reference file may be appended with the corresponding ordered children data and stored at step 760. The ordered children of the claim generally refers to children of the claim that are residing one vertical order downwards from the claim, and are further ordered by horizontal order.

To determine the ordering of all claims, the process described herein with respect to FIG. 7 may be repeated for each claim. As such, a determination is made at step 765 as to whether additional claims need to be ordered. If so, the process returns to step 705. Otherwise, the process ends.

The resulting data file that is generated from the various steps of FIG. 7 provides the information necessary to generate the streamlined claim tree depicted in FIG. 5B. That is, the data file contains information for each claim that indicates its position relative to the other claims in the streamlined claim tree, as well as the interconnecting lines between claims of the claim tree. As such, a streamlined claim tree may be generated from the data file generated and appended according to the steps depicted in FIG. 7.

Figure 8:
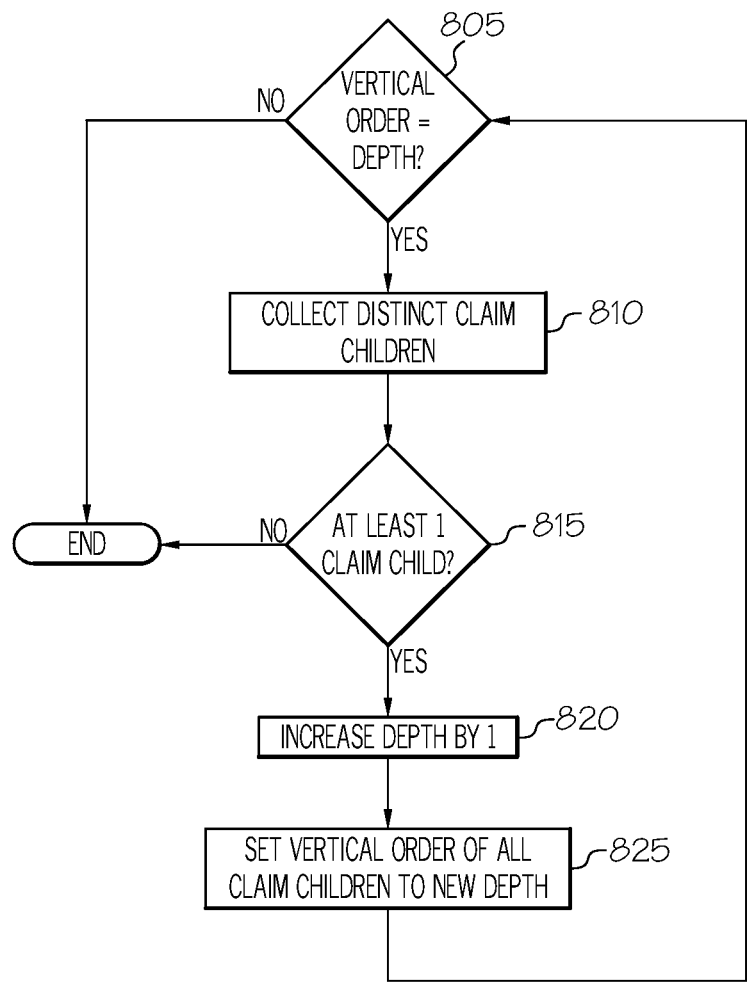
FIG. 8 depicts a flow diagram of an illustrative method of determining a vertical order of a plurality of claims in a claim set according to one or more embodiments shown and described herein.
Figure 9:
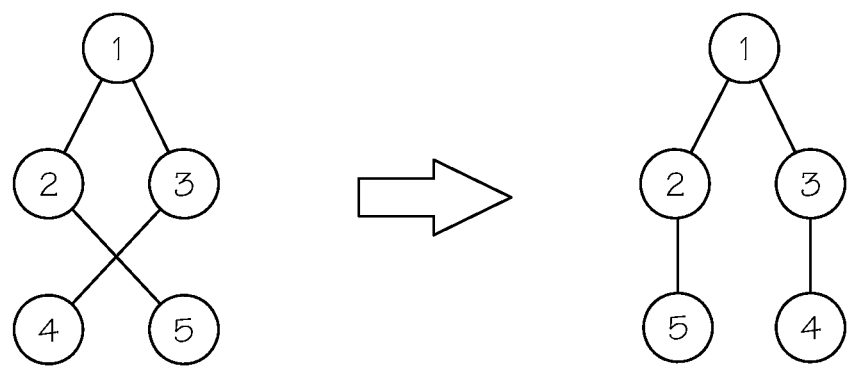
FIG. 9 schematically depicts an illustrative process of rearranging a horizontal order of claims in a streamlined claim tree according to one or more embodiments shown and described herein.

The horizontal order and vertical order of each claim can be determined according to the flow diagrams depicted in FIGS. 8, 9, and 11. As will be described in greater detail herein, a horizontal order for each claim is set from 0 to N, where N corresponds to the highest claim in the claim set. The vertical order of a claim having zero references is set to zero. Otherwise, the vertical order is set to −1.

Referring to FIG. 8, to calculate the vertical order of a claim, a depth variable is set to 0. Then at step 805, a determination is made as to whether a particular claim has a vertical order that is equal to the depth. If so, all of the distinct children of that claim are collected at step 810. At step 815, a determination is made as to whether any claim children (e.g., at least 1 claim child) has been found. If no, the process may end. Otherwise, the depth is increased by 1 at step 820. The vertical order of each of the collected children is then set to the new depth (e.g., the depth that is increased by 1) at step 825, and the process may return to step 805 to repeat.

To calculate the horizontal order of a claim, two adjacent vertical order planes are taken and a determination is made as to which order the claims need to be in to minimize line crossings. That is, the claims are rearranged in any manner that minimizes the amount of line crossings (e.g., line overlaps) that would occur on the lines that extend between the claims. For example, as shown in FIG. 9, the horizontal order of claims 4 and 5 are rearranged in such a manner so that the line extending between claims 2 and 5 does not cross over the line extending between claims 3 and 4. When reference lines are removed. important and/or crucial information on direct references may be lost. As such, interaction with the claim tree to reveal the missing information may be necessary by using color coding (or the like) of direct and indirect dependencies in both parent and child directions when a claim circle in the tree is selected (e.g., moving a mouse cursor over the portion of the tree, highlighting a portion of the tree, etc.). Filtering and highlighting techniques may also be applied to the claim text itself. For example, a user may be enabled to select a claim, which transforms the view to show the direct references, indirect references, the direct referenced by, the indirect referenced by, and the unrelated claims, in one or more groups. This may provide, for example, useful information to claim lawyers and may save time to analyze important relationships between claims.

Figure 10:
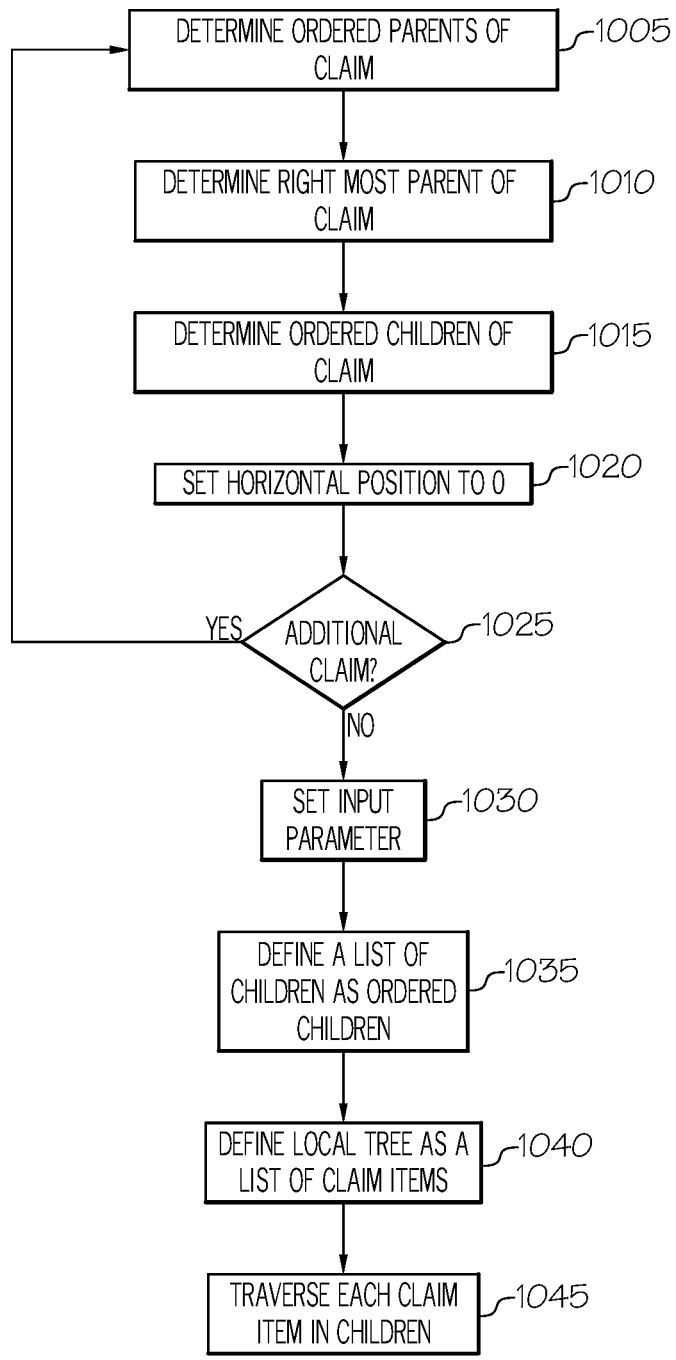
FIG. 10 depicts a flow diagram of an illustrative method of determining a horizontal order of each of a plurality of claims in a claim set according to one or more embodiments shown and described herein.

Referring to FIG. 10, to calculate the horizontal order of a claim, the ordered parents of the claim are determined at step 1005, the right most parent of the claim is determined at step 1010, the ordered children of the claim are determined at step 1015, and the horizontal position is initially set to 0 at step 1020. To ensure the horizontal order of the claim is completed for all claims, this process may be repeated for each claim by determining whether additional claims exist at step 1025 and if so, returning to step 1005. One the process is completed for all of the claims in the claim set, the process proceeds to step 1030.

At step 1030, the input parameter is set for a particular claim, which corresponds to the claim number ("InputClaimItem"). At step 1035, a list of children of the claim is defined as the ordered children ("OrderedChildren") thereof. At step 1040, a local tree ("LocalTree") is defined as a list of claim items, and at step 1045, each claim item in the children is traversed. If the claim's right most parent is equal to the input parameter, the process may repeat step 1030 with the input parameter the claim number and capture the return value in a list of claim numbers. The claim number may be inserted at the start of the returned list, and any neighbors may be discovered between the list and the local tree where the claim's vertical order is the same and the list's horizontal order is equal to the local tree's horizontal order, plus one.

It should now be understood that the systems and methods described herein can accurately determine the claims in a patent document, determine any references in each claim, and provide a streamlined claim tree that may provide an easier means of visualizing the relationship between claims.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of determining and indicating a relationship between patent claims, the method comprising:
   determining, by a processing device, one or more claims in a claim list;
   searching, by the processing device, for at least one reference in each one of the one or more claims, wherein the at least one reference refers to another one of the one or more claims in the claim list; and
   for each one of the one or more claims containing one or more unique references:
      determining, by the processing device, that an associated number for each of the one or more unique references is less than a number of a claim containing the one or more unique references,
      appending, by the processing device, a data file corresponding to the claim list with ancestral data that indicates all ancestors of the claim based on the associated number,
      appending, by the processing device, the data file with self-referential data corresponding to the claim, determining, by the processing device, that the claim comprises one or more parent claims, appending, by the processing device, the data file to indicate, with respect to information relating to the one or more parent claims, a relationship between the claim and the one or more parent claims,
      determining, by the processing device, that the claim comprises one or more ancestor claims, and
      appending, by the processing device, the data file to indicate, with respect to information relating to the one or more ancestor claims, a relationship between the claim and the one or more ancestor claims such that the data file indicates the relationship between patent claims.

2. The method of claim 1, further comprising:
   determining, by the processing device, that the claim contains the at least one reference; and
   determining, by the processing device, whether the at least one reference contains a claim number that is lower than a claim number of the claim containing the at least one reference.

3. The method of claim 2, further comprising:
   when the at least one reference contains a claim number that is higher or equal to the claim containing the at least one reference, appending, by the processing device, the data file with independent claim data that indicates that the claim is an independent claim.

4. The method of claim 1, further comprising:
   when a claim of the one or more claims does not contain the at least one reference, appending, by the processing device, the data file with independent claim data that indicates that the claim is an independent claim.

5. The method of claim 1, further comprising:
   generating, by the processing device, a streamlined claim tree from the data file.

6. The method of claim 1, wherein determining the one or more claims in the claim list comprises determining each claim of the one or more claims and an associated number for each claim of the one or more claims.

7. The method of claim 1, wherein all ancestors of the claim includes other claims that are referenced by the claim and are not parents of the claim.

8. The method of claim 1, wherein the one or more parent claims are one or more immediate ancestors of the claim.

9. The method of claim 1, wherein the data file is an XML file.

10. A system for determining and indicating a relationship between patent claims, the system comprising:
- a processing device; and
- a non-transitory, processor-readable storage medium in communication with the processing device, wherein the non-transitory, processor-readable storage medium comprises one or more programming instructions that, when executed, cause the processing device to:
  - determine one or more claims in a claim list,
  - search for at least one reference in each one of the one or more claims, wherein the at least one reference refers to another one of the one or more claims in the claim list, and
  - for each one of the one or more claims containing one or more unique references:
    - determine that an associated number for each of the one or more unique references is less than a number of a claim containing the one or more unique references,
    - append a data file corresponding to the claim list with ancestral data that indicates all ancestors of the claim based on the associated number,
    - append the data file with self-referential data corresponding to the claim,
    - determine that the claim comprises one or more parent claims,
    - append the data file to indicate, with respect to information relating to the one or more parent claims, a relationship between the claim and the one or more parent claims,
    - determine that the claim comprises one or more ancestor claims, and
    - append the data file to indicate, with respect to information relating to the one or more ancestor claims, a relationship between the claim and the one or more ancestor claims such that the data file indicates the relationship between patent claims.

11. The system of claim 10, wherein the non-transitory, processor-readable storage medium further comprises one or more programming instructions that, when executed, cause the processing device to:
- determine that the claim contains the at least one reference; and
- determine whether the at least one reference contains a claim number that is lower than a claim number of the claim containing the at least one reference.

12. The system of claim 11, wherein the non-transitory, processor-readable storage medium further comprises one or more programming instructions that, when executed, cause the processing device to:
- append the data file with independent claim data that indicates that the claim is an independent claim when the at least one reference contains a claim number that is higher or equal to the claim containing the at least one reference.

13. The system of claim 10, wherein the non-transitory, processor-readable storage medium further comprises one or more programming instructions that, when executed, cause the processing device to:
- when a claim of the one or more claims does not contain the at least one reference; append the data file with independent claim data that indicates that the claim is an independent claim.

14. The system of claim 10, wherein the non-transitory, processor-readable storage medium further comprises one or more programming instructions that, when executed, cause the processing device to:
- generate a streamlined claim tree from the data file.

15. The system of claim 10, wherein the one or more programming instructions that, when executed, cause the processing device to determine the one or more claims in the claim list further cause the processing device to determine each claim of the one or more claims and an associated number for each claim of the one or more claims.

16. The system of claim 10, wherein all ancestors of the claim includes other claims that are referenced by the claim and are not parents of the claim.

17. The system of claim 10, wherein the one or more parent claims are one or more immediate ancestors of the claim.

18. The system of claim 10, wherein the data file is an XML file.

19. A method of electronically generating a streamlined claim tree indicating one or more relationships between patent claims, the method comprising, for each claim of the patent claims:
- determining, by a processing device, a vertical order of a claim;
- appending, by the processing device, a data file corresponding to a claim list of the patent claims with vertical order data corresponding to the vertical order;
- determining, by a processing device, a horizontal order of the claim;
- appending, by the processing device, the data file with horizontal order data corresponding to the horizontal order;
- determining, by the processing device, a horizontal position of the claim;
- appending, by the processing device, the data file with horizontal position data corresponding to the horizontal position;
- determining, by the processing device, one or more ordered parents of the claim;
- appending, by the processing device, the data file with ordered parents data corresponding to the one or more ordered parents;
- determining, by the processing device, a right most parent of the claim;
- appending, by the processing device, the data file with right most parent data corresponding to the right most parent;
- determining, by the processing device, one or more ordered children of the claim; and
- appending, by the processing device, the data file with ordered children data corresponding to the one or more ordered children,
- wherein:
  - the vertical order, the horizontal order, the horizontal position, the one or more ordered parents, the right most parent, and the one or more ordered parents are determined from generated relationship data, and
  - the data file provides information for generating the streamlined claim tree.

20. The method of claim 19, wherein determining the horizontal order of the claim comprises determining an order of the patent claims that minimizes an amount of line crossings that would occur between one or more lines extending between the patent claims in the streamlined claim tree.

* * * * *

UNITED STATES PATENT AND TRADEMARK OFFICE
CERTIFICATE OF CORRECTION

PATENT NO. : 10,540,443 B2
APPLICATION NO. : 15/384870
DATED : January 21, 2020
INVENTOR(S) : Peter Francisco Aragon y Willems Page 1 of 1

It is certified that error appears in the above-identified patent and that said Letters Patent is hereby corrected as shown below:

In Column 1, Line 25, delete "detectable" and insert --detectible--, therefor.

In Column 4, Line 29, delete "claim 1, 2, 3," and insert --claims 1, 2, 3,--, therefor.

In Column 15, Line 2, delete "claim 1, 2, or 3," and insert --claims 1, 2, or 3,--, therefor.

In Column 16, Line 42, delete "claim 2 or 3" and insert --claims 2 or 3--, therefor.

In Column 16, Line 45, delete "claim 3 or 4" and insert --claims 3 or 4--, therefor.

Signed and Sealed this
Twenty-fifth Day of August, 2020

Andrei Iancu
*Director of the United States Patent and Trademark Office*